No. 859,638. PATENTED JULY 9, 1907.
J. W. BENNETT.
AUTOMATIC ANIMAL TRAP.
APPLICATION FILED FEB. 13, 1907.
2 SHEETS—SHEET 1.
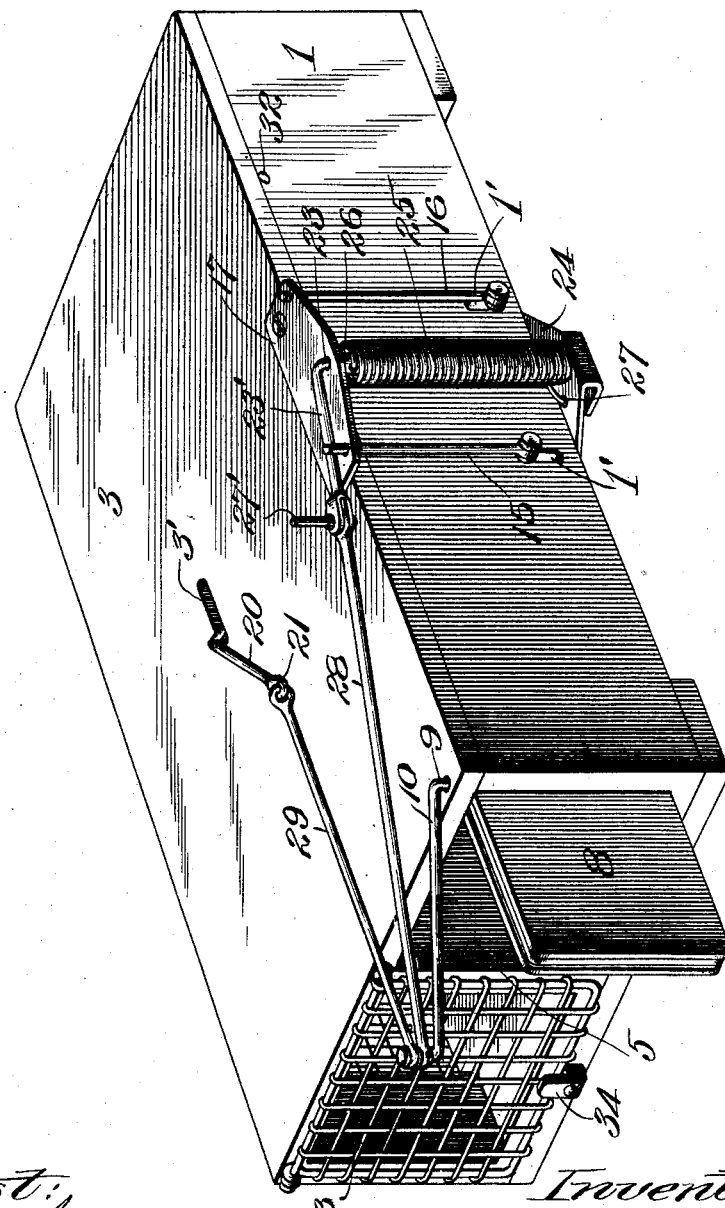

No. 859,638. PATENTED JULY 9, 1907.
J. W. BENNETT.
AUTOMATIC ANIMAL TRAP.
APPLICATION FILED FEB. 13, 1907.
2 SHEETS—SHEET 2.
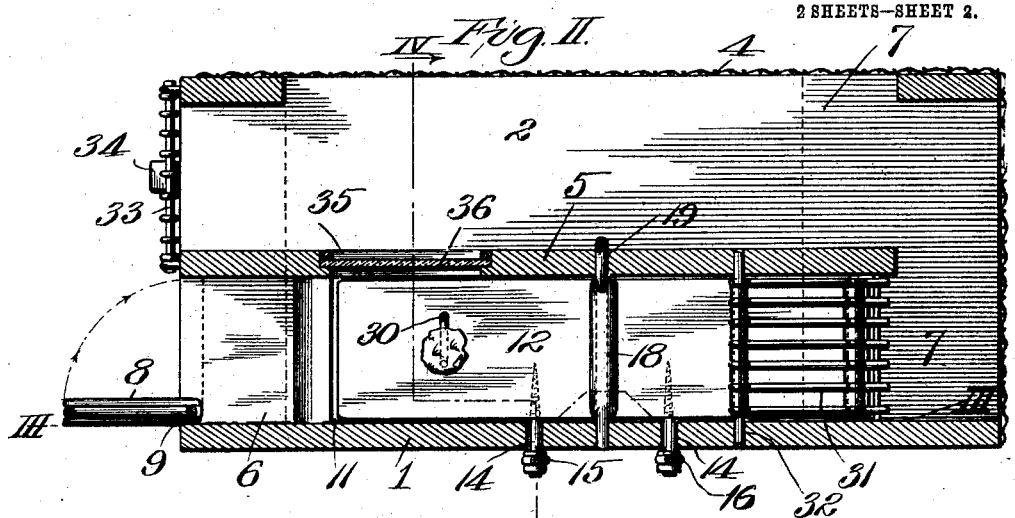
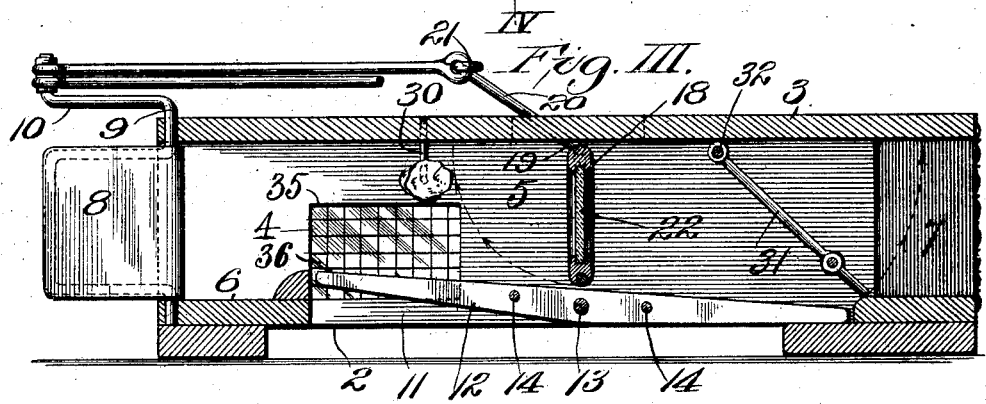
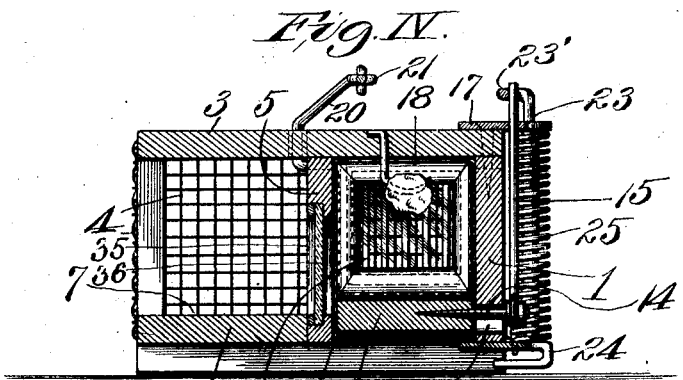

UNITED STATES PATENT OFFICE.

JACKSON W. BENNETT, OF CARTHAGE, MISSOURI, ASSIGNOR OF ONE-HALF TO KEIM & McMILLAN HARDWARE COMPANY, OF CARTHAGE, MISSOURI, A CORPORATION.

AUTOMATIC ANIMAL-TRAP.

No. 859,638.  Specification of Letters Patent.  Patented July 9, 1907.

Application filed February 13, 1907. Serial No. 357,176.

*To all whom it may concern:*

Be it known that I, JACKSON W. BENNETT, a citizen of the United States of America, residing in Carthage, in the county of Jasper and State of Missouri, have invented certain new and useful Improvements in Automatic Animal-Traps, of which the following is a full, clear, and exact description, reference being had to the accompanying drawings, forming part of this specification.

This invention relates to an automatic animal trap which is provided with a housing having a longitudinal partition extending from the front end of the housing toward the rear end of the housing and a swinging rear door between the rear end of the partition and one side of the housing forming an L-shaped cell for the reception of the animals after they are imprisoned extending along one side of the partition and across the rear end to the rear door and a passageway extending along the other side of the partition to the cell through which the animals enter into the trap, said passageway containing means whereby the entrance way is automatically closed and whereby means for controlling said passageway is first automatically opened to permit the animal to pass to the cell and whereby said passageway controlling means is automatically closed and the means for guarding the entrance way is again opened after the animal has continued its course into the cell.

Figure I is a perspective view of the trap in an open or set condition. Fig. II is a horizontal section taken through my trap. Fig. III is a vertical longitudinal section taken on line III—III, Fig. II. Fig. IV is a vertical cross section taken on line IV—IV, Fig. II.

1 designates one of the side walls, 2 the bottom and 3 the top of the trap. The other side wall and the rear wall of the trap are preferably formed by the application of a sheet 4 of netting in order that a view may be obtained to the interior of the trap which is partially inclosed by said walls.

The interior of the trap is subdivided by a longitudinal partition 5, extending from the front end of the trap toward the rear end of the trap, and a swinging rear door into a side passageway 6 and a cell 7 of L-shape. 8 is an outer door which is located at the front of the passageway 6 and 9 is a hinge rod that supports the door and is loosely mounted in the top and bottom of the trap, the rod being preferably bent into U-shape in order that it will lie in the edge of and firmly embrace said door for the purpose of imparting movement thereto when the rod is rotated. The hinge rod terminates at its upper end in a crank arm 10 that receives the connection of certain door operating parts to be hereinafter more particularly referred to. In the bottom of the trap beneath the passageway 6 is an opening 11.

12 is a tilting platform which is mounted upon a horizontal pivot rod 13 seated in the bottom of the trap and which platform occupies a position in the bottom opening 11.

14 are pins or screws seated in the tilting platform at opposite sides of the pivot rod 13 and having fitted thereto stop rods 15 and 16, the former of which is located in front of the pivot rod and the latter of which is located at the rear of said pivot rod. These stop rods extend vertically from the pins 14 to and through a bracket 17 mounted on the top of the trap and projecting beyond the side wall 1. The rods are adapted to play loosely through said bracket in a vertical direction when the platform 12 is tilted and to permit this movement of the rods the side wall 1 is slotted at 1' in order that the pins 14 may operate vertically therein.

18 designates a vertically swinging inner door located in the passageway 6 and supported above the pivotal point of the tilting platform 12. This door is supported for vertical swinging movement by a hinge rod 19 that is loosely mounted in the side wall 1 and partition 5 of the trap and is provided with a crank arm 20 which extends upwardly through a slot 3' in the top of the trap and terminates in an eye 21. The hinge rod of the inner door is preferably bent into U-shape so that it will embrace the door in the same manner as the hinge rod of the outer door 8 embraces said last named door and the inner door is preferably provided with an opening which is occupied by a transparent sheet 22 in order that a view may be obtained through the door.

23 designates an operating rod that is loosely mounted in the top bracket 17 and in a lower bracket 24 that is secured to the bottom of the trap beneath said upper bracket plate.

25 is a power spring that is connected at one end to the operating rod as seen at 26, and at the other end to the lower bracket as seen at 27. The operating rod 23 terminates at its upper end in a crank arm 23' that is provided with a handle 27' and is adapted to move in a path that is intersected by the upper ends of the stop rods 15 and 16.

28 is a connecting rod that is pivoted to the operating rod crank arm and the crank arm of the outer door hinge rod 9.

29 is a connecting rod that is loosely united at its rear end to the eye of the crank arm 20 of the inner door hinge rod and pivoted to the crank arm of the outer door hinge rod.

30 is a bait supporting hook that is seated in the top of the trap and by which bait may be upheld in an enticing position over the forward end of the tilting platform 12.

31 designates a grate work door that is supported for vertical swinging movement by a hinge rod 32 and is located above the rear end of the tilting platform 12. This door opens rearwardly in the passageway 6 and serves to form a guard at the rear end of said passageway, whereby the animals that have passed into the cell 7 of the trap are prevented from again moving onto the tilting platform.

33 is a door controlling the exit from the cell of the trap through which the trapped animals are removed, the said door being held in a closed condition by a latch or button 34.

35 is a sight opening in the partition 5 that is guarded by a transparent sheet 36 and through which a view may be obtained from the passageway 6 to the cell 7 and vice versa.

In the practical use of my trap, the trap is first set to render it operative by winding the power spring 25 through the medium of the crank arm of the operating rod 23 for which purpose the operator grasps the handle 27' of said arm. During the rotation of the operating rod crank arm the stop rods 15 and 16 are alternately lowered so that they will be moved out of the circular path of travel of the crank arm and during this movement of the stop rods the tilting platform is rocked on its pivot as is obvious. While the spring is being wound to store power therein, the outer and inner doors 8 and 18 are alternately opened and closed due to the crank arm of the operating rod being united by the connecting rod 28 to the crank arm of the outer door hinge rod and the connecting rod 29 uniting said hinge rod crank arm to the crank arm of the inner door hinge rod. The manipulation of the parts is continued until the power spring is placed under the desired tension and when such manipulation is discontinued the crank arm of the operating rod is brought to rest against the stop rod 15 whereby said stop rod serves to hold the operating rod from movement while the outer door 8 is in an open position and the forward end of the tilting platform is in an elevated position. The trap at this time, being set, is in condition for use for catching animals. As an animal enters the passageway 6 he steps upon the front end of the tilting platform and said end is depressed, due to the weight of the animal while the rear end of the platform moved upwardly. During the downward movement of the front end of the platform the stop rod 15 is retracted from engagement with the operating rod crank arm and therefore said operating rod is rotated until its crank arm is moved into engagement with the stop rod 16 which is moved upwardly simultaneously with the downward movement of the stop rod 15. While the operating rod is moving as described, it acts to close the outer door 8 through the medium of the connecting rod 28 and to open the inner door 18 through the medium of the connecting rod 29. The passageway 6 is therefore rendered an open one within the trap back of the outer door with the exception of the grate work door 31 and the animal seeing no means of escape through the entrance to the passageway, moves rearwardly on the tilting platform and across its pivotal point, thereby causing the rear end of the platform to be tilted downwardly by his weight while the upper end of the platform is again elevated. Upon this movement of the platform the rear stop rod 16 is retracted to free the operating rod 23 while the forward stop rod 15 is again elevated to restrict the degree of movement of said operating rod and, as a consequence, the operating rod moves in a degree sufficient to close the inner door and open the outer door with the trap again in set condition. After the animal has caused the trap to be again set in the manner stated he finds that there is no means of returning through the passageway 6 and he therefore naturally, in nosing around, discovers that the grate work door 31 is yielding and he readily elevates it and gains access to the cell 7 from which he cannot return to the passageway, due to the position in which the grate work door is suspended.

I claim:

1. An animal trap comprising a housing, and a longitudinal partition extending from the front end of the housing toward the rear end thereof and a swinging rear door between the rear end of the partition and one side of the housing and dividing the housing into a passageway extending along one side of the partition and also into an L-shaped cell extending along the other side of the partition, transversely of the rear end of the housing and meeting the rear end of the passageway at the rear door, a swinging outer door at the front end of the passageway, for controlling the entrance to the latter, a tilting platform at the bottom of said passageway between the outer door and the rear door, a swinging inner door above the platform, and operating means for said outer door controlled by said platform; substantially as set forth.

2. An animal trap comprising a housing, and a longitudinal partition extending from the front end of the housing toward the rear end thereof and a swinging rear door between the inner end of the partition and one side of the housing and dividing the housing into a passageway extending along one side of the partition and also into an L-shaped cell extending along the other side of the partition, transversely of the rear end of the housing and meeting the rear end of the passageway at the rear door, a swinging outer door at the front end of the passageway, for controlling the entrance to the latter, spring controlled means for operating said outer door, a tilting platform at the bottom of said passageway between the outer door and the rear door, a swinging inner door above the platform, and means carried by said platform for controlling said outer door operating means, substantially as set forth.

3. In an animal trap, a housing subdivided into a passageway and a cell, a door for controlling said passageway, spring controlling means for operating said door, a tilting platform at the bottom of said passageway, pivoted in the middle so that either end may be elevated and means connected to said platform whereby said door operating means is brought to rest when either end of said platform is elevated, substantially as set forth.

4. In an animal trap, a housing subdivided into a passageway and a cell, a door for controlling said passageway, spring controlled means for operating said door, a tilting platform at the bottom of said passageway and means connected to said platform at opposite sides of its point of pivotal support whereby said door operating means is brought to rest when either end of said platform is elevated, substantially as set forth.

5. In an animal trap, a housing subdivided into a passageway and a cell, a door for controlling said passageway spring controlled means for operating said door, a tilting platform at the bottom of said passageway and stop-rods connected to said platform at opposite sides of its point of pivotal support and movable into the path of travel of a portion of said door operating means, substantially as set forth.

6. In an animal trap, a housing subdivided into a passageway and a cell, a door for controlling said passageway, a spring controlled rod for operating said door, and which is provided with a crank arm a tilting platform at the bottom of said passageway and stop-rods connected to said platform at opposite sides of its point of pivotal support and movable into the path of travel of said crank arm, substantially as set forth.

7. In an animal trap, a housing subdivided into a passageway and a cell, a door for controlling said passageway a spring controlled rod for opening and closing said door and provided with a crank arm and a connecting rod uniting said spring controlled rod to said door, a tilting platform at the bottom of said passageway and a pair of stop-rods connected to said door at opposite sides of its point of pivotal support and movable into and out of the path of travel of said crank arm, substantially as set forth.

8. In an animal trap, a housing subdivided into a passageway and a cell, a pair of doors controlling said passageway, means for alternately opening and closing said doors, a tilting platform at the bottom of the passageway and means connected to said platform at opposite ends of its point of pivotal support and movable into and out of the path of travel of said door opening and closing means, substantially as set forth.

9. In an animal trap, a housing subdivided into a passageway and a cell, a pair of doors for controlling said passageway, spring controlled means for alternately opening and closing said doors, a tilting platform at the bottom of said passageway and stop-rods connected to said platform at opposite sides of its point of pivotal support and movable into and out of the path of travel of said door opening and closing means, substantially as set forth.

10. In an animal trap, a housing subdivided into a passageway and a cell, a pair of doors for controlling said passageway spring controlled means for alternately opening and closing said doors, a tilting platform at the bottom of said passageway and stop-rods connected to said platform at opposite sides of its point of pivotal support and movable into and out of the path of travel of said door opening and closing means, and a guard door located at the rear end of said platform, substantially as set forth.

JACKSON W. BENNETT.

In the presence of—
W. A. WILLIAMS,
E. H. WYATT.